April 19, 1927.
R. W. SEABURY
1,625,749
COMPOSITE ARTICLE AND PROCESS OF MAKING SAME
Filed July 21, 1922
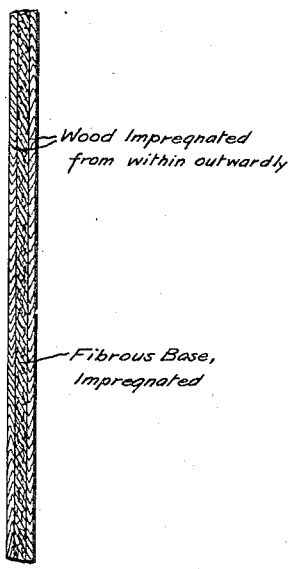
Wood Impregnated from within outwardly
Fibrous Base, Impregnated
Inventor:
Richard W. Seabury,
By Byrnes Townsend & Brickenstein
Attorneys.

Patented Apr. 19, 1927.

1,625,749

UNITED STATES PATENT OFFICE.

RICHARD W. SEABURY, OF BOONTON, NEW JERSEY, ASSIGNOR TO RADIO FREQUENCY LABORATORIES, INCORPORATED, OF BOONTON, NEW JERSEY, A CORPORATION OF NEW JERSEY.

COMPOSITE ARTICLE AND PROCESS OF MAKING SAME.

Application filed July 21, 1922. Serial No. 576,637.

This invention relates to composite or laminated sheets or other articles, and comprises a novel article of this type and a novel process for its preparation. In a typical and preferred embodiment the invention comprises a laminated sheet presenting on one or both sides surfaces of wood, firmly cemented to and combined with a flexible fibrous material such as paper, felt or cloth, hereinafter referred to as a fibrous base. My preferred binding agent, which serves also as below described as a partial or complete impregnation for the wood layer, is a phenolic condensation product of the so-called potentially reactive type which is capable of transformation by sufficient heating into an infusible body. It is well known that condensation products possessing the property of becoming infusible under the action of heat have been employed heretofore as binding and impregnating agents in the assembly of laminated bodies, as disclosed for example in the United States patents to Baekeland Nos. 1,019,406 and 1,019,408 patented March 5, 1912; but my laminated product presents certain features of distinction and advantage, as hereinafter fully set forth.

The drawing forming part of the specification shows a section of my composite sheet. In preparing the laminated sheet or similar article, I preferably apply non-impregnated but pervious sheets or so-called veneers of wood to one or both sides of the fibrous base, which may itself comprise a single sheet or any desired number of such sheets of paper, cloth or similar materials, and which has been coated or impregnated with the phenolic condensation product in its initial or fusible state, commonly referred to in this art as the "A" condition. Upon subjecting the resulting assembly to heavy pressure at a sufficient temperature the phenolic condensation product at first melts and impregnates the wood layer or layers from within outwardly, the impregnation extending either partially or completely through the wood according to the thickness and perviousness of the latter, and the amount of impregnating agent used. In any case the quantity of impregnating agent should be sufficient to insure that the wood is firmly and indissolubly cemented to the paper or fabric base: and the temperature and time of heating should be sufficient to effect the transformation of the phenolic condensation product into its infusible state or a sufficiently close approximation to the final state for the particular purposes in view. This operation is ordinarily carried out between steam-heated platens in a hydraulic or other press, and is now well understood by those skilled in this art.

The article prepared as above not only presents a pleasing appearance, but possesses most desirable characteristics from mechanical, physical and chemical view points, being quite free from tendency to warp, and, as compared with wood, relatively unaffected by moisture, or even by water at a boiling temperature. It is very resistant to ordinary chemicals and will withstand without injury temperatures destructive to wood. It is practically non-inflammable. It may present smooth and plane surfaces; or according to the conformation of the platens it may be given any desired curvature or contour; or it may be impressed in any desired configuration or design. Naturally the characteristics of the article will vary in accordance with the degree to which the phenolic condensation product has penetrated to or toward the exposed surface of the wood.

The fibrous base, in case paper is used, may comprise a single sheet of paper or any desired number of such sheets; and some or all of these sheets may be impregnated with substances other than phenolic condensation products, such for example as asphaltic or other bituminous bodies, resinous substances, or like fusible impregnating agents. For example I have successfully employed for this purpose ordinary roofing paper, so-called, both impregnated and non-impregnated, and I have also used a laminated paper product whereof the interior ply or plies have been impregnated with a bituminous or asphaltic material, the outer or exposed plies being non-impregnated and consequently porous. The use of such impregnated or partially impregnated sheets of paper, felt, fabric or the like presents the advantage that a much smaller proportionate quantity of the more expensive phenolic condensation product is required than would otherwise be the case; but care must be taken that the proportion of the bitumen or other fusible substance to fiber is not excessive, since otherwise it will tend to flow irregularly and excessively under the high temperature of the molding or pressing operation. In the finished article the fusible impregnating material is so fully encased in or confined by the layers containing the infusible and immobile phenolic condensation product, that further movement of the former need not be apprehended, even at high temperatures.

Plates or panels prepared as hereinabove described are well adapted to replace mahogany and other expensive woods in their applications to furniture and cabinet work, such for example as desk-tops, filing cabinets and the like: furthermore such panels, by reason of their imperviousness and water-repellent quality, are excellent electrical insulators and are well suited for use in connection with radio receiving sets or cabinets and all analogous applications.

For certain applications where a wood finish is not desired, one or both of the exterior laminations may be of a fibrous material other than wood, such for example as paper or cloth, impregnated from within outwardly as described above with the phenolic condensation product transformed to the infusible state, and associated with one or more interior layers constituting a fibrous base impregnated with a fusible substance, usually of a bituminous or asphaltic nature; and such composite sheets or other articles are comprised within the present invention. Many other modifications may be made within the spirit of my invention. Any binder which is capable of flowing under moderate application of heat but is rendered infusible or immobile by application of higher temperatures, and which possesses the other requisite physical and chemical properties, is to be regarded as an equivalent for the purposes of this invention, of the phenolic condensation products of the potentially reactive type.

I claim:

1. A composite article presenting an exterior surface of wood, and a fibrous base therefor, the wood cemented to the fibrous base by means of an infusible phenolic condensation product and impregnated therewith from within outwardly, said fibrous base impregnated with a bituminous material.

2. A composite article composed of a plurality of laminations or layers of fibrous material, and comprising an exterior layer impregnated with an infusible phenolic condensation product, and an interior layer comprising fibrous material impregnated with a bituminous material.

3. Method of making a composite article comprising applying to a fibrous base impregnated with a bituminous material, a phenolic condensation product in fusible state; applying thereto a pervious sheet; and subjecting the assembly to heat and pressure, whereby the previous sheet is impregnated with the phenolic condensation product from within outwardly and the latter is transformed to an infusible condition.

In testimony whereof, I affix my signature.

RICHARD W. SEABURY.